(No Model.)    4 Sheets—Sheet 1.
E. C. MORGAN.
ELECTRIC MINING MACHINE.
No. 550,283.    Patented Nov. 26, 1895.
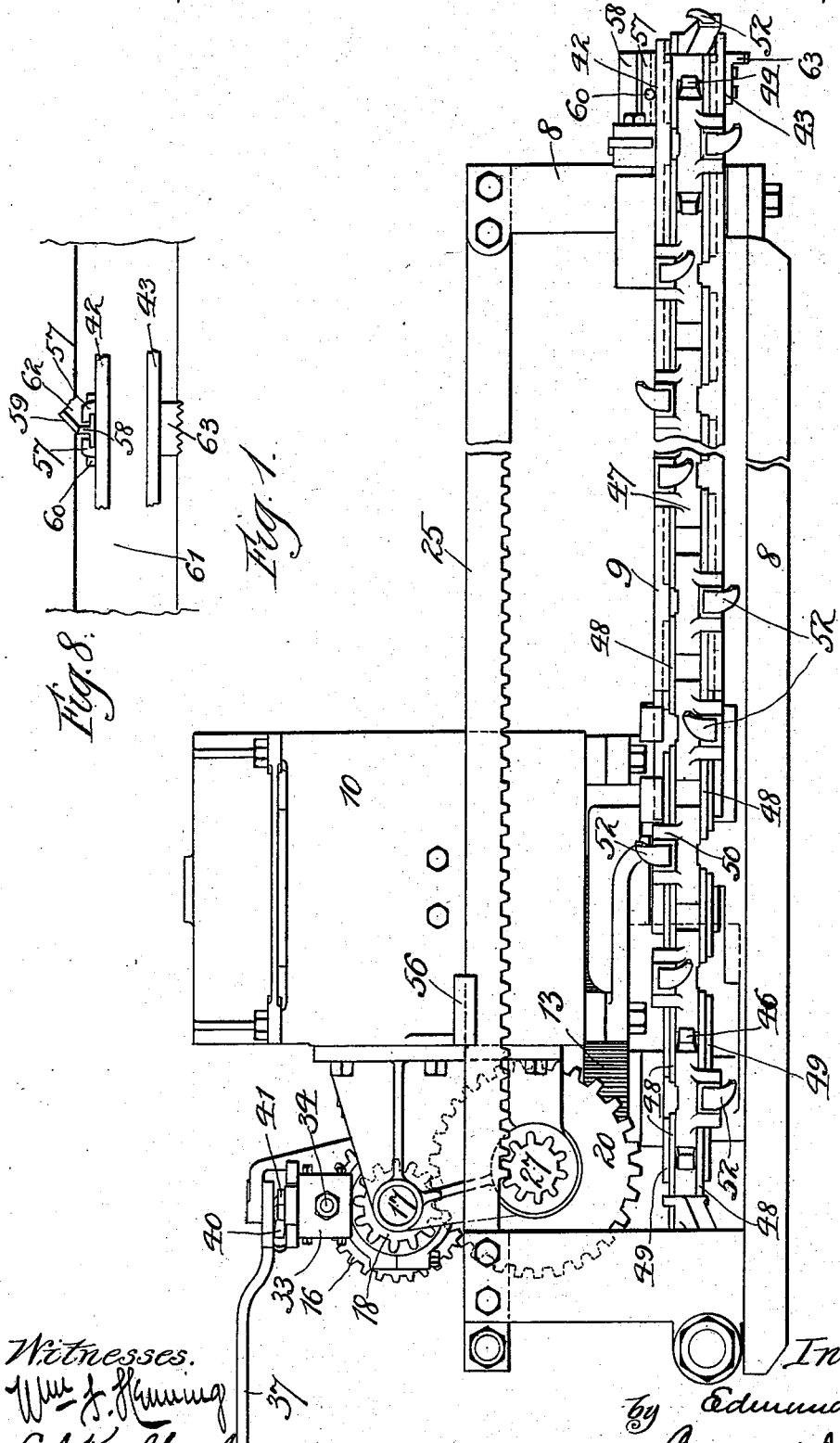

(No Model.) 4 Sheets—Sheet 2.
E. C. MORGAN.
ELECTRIC MINING MACHINE.
No. 550,283. Patented Nov. 26, 1895.
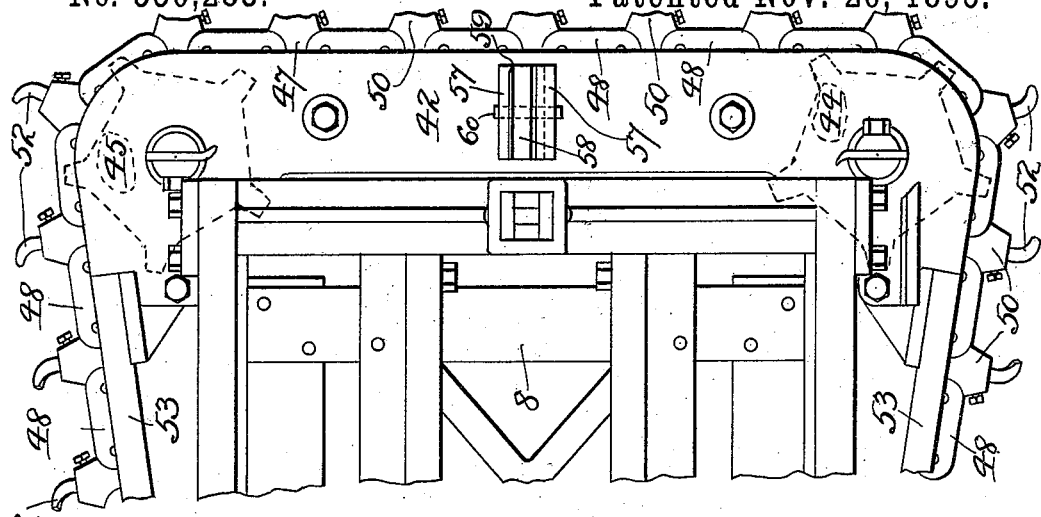
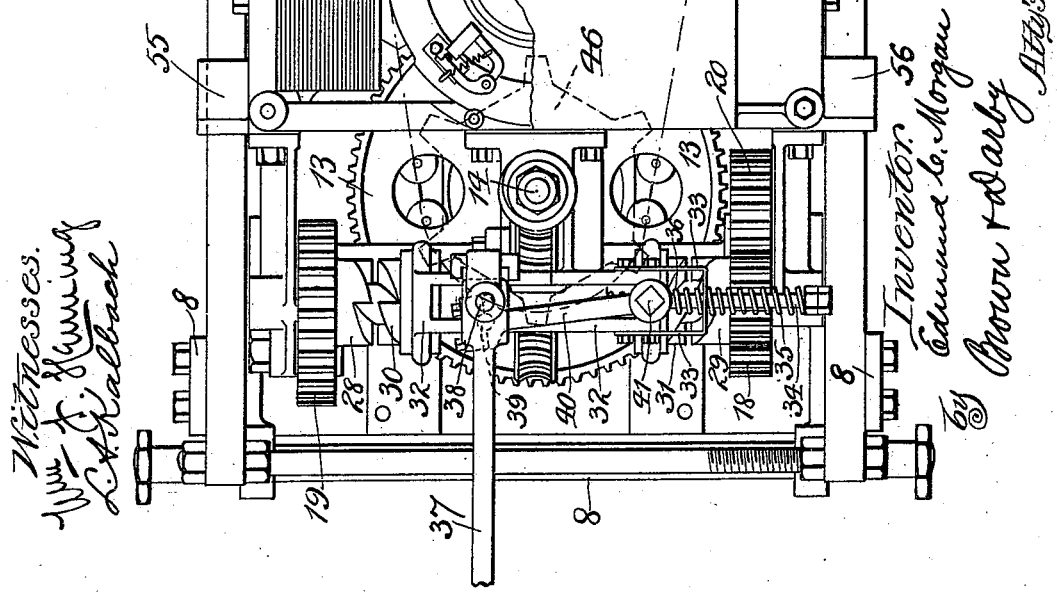

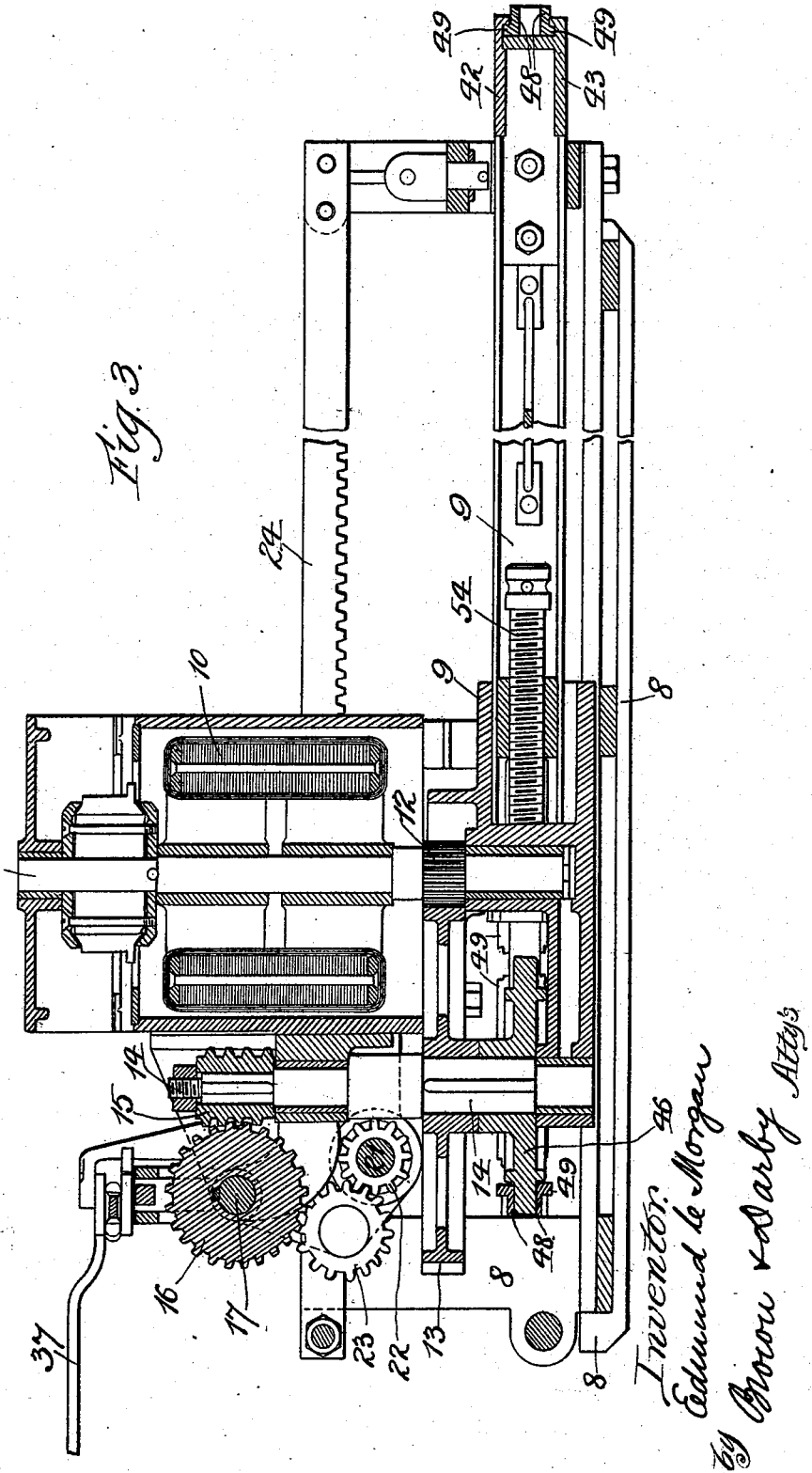

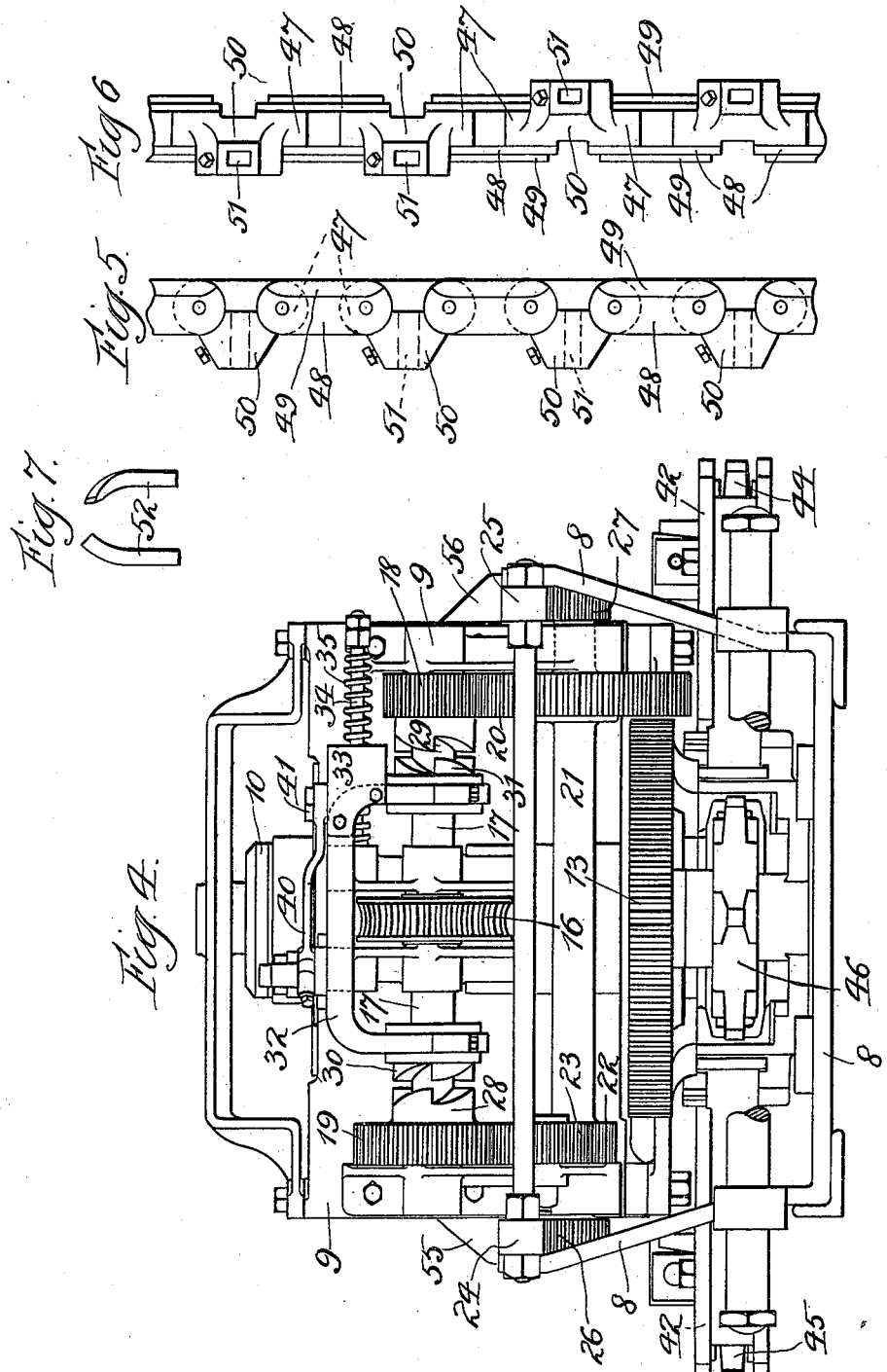

UNITED STATES PATENT OFFICE.

EDMUND C. MORGAN, OF CHICAGO, ILLINOIS.

ELECTRIC MINING-MACHINE.

SPECIFICATION forming part of Letters Patent No. 550,283, dated November 26, 1895.

Application filed December 12, 1894. Serial No. 531,549. (No model.)

*To all whom it may concern:*

Be it known that I, EDMUND C. MORGAN, a citizen of the United States, residing at Chicago, in the county of Cook and State of Illinois, have invented a new and useful Improvement in Electric Mining-Machines, of which the following is a specification.

This invention relates to electric mining-machines.

The object of the invention is to provide an electrically-operated mining-machine of novel and simple construction, easily understood and operated, and effective in operation.

The invention consists substantially in the construction, combination, location, and relative arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in side elevation of a machine embodying my invention. Fig. 2 is a plan view of the same. Fig. 3 is a vertical central longitudinal sectional view. Fig. 4 is a rear end elevation. Figs. 5 and 6 are detail views in plan and side elevation, respectively, of the cutter-chain. Fig. 7 is a detail view of the cutters. Fig. 8 is a detail view illustrating the action of the steadying device for cutter-chain carrier.

The same reference-sign is used throughout the drawings to designate the same part wherever it occurs.

In carrying out my invention I provide a suitable stationary framework 8 of proper shape and proportions to support and accommodate the various mechanisms hereinafter described. Mounted to slide upon the stationary frame 8 is a movable frame 9, upon which is mounted an electric motor 10 of suitable construction.

Upon the shaft 11, which constitutes the armature-shaft of the electric motor, is mounted a gear-wheel 12, Fig. 3, arranged to engage a gear 13, mounted upon a shaft 14, arranged in suitable bearings in the movable frame 9 and parallel with the armature-shaft 11 of the motor. Upon shaft 14 is mounted a worm-gear 15, arranged to engage a corresponding worm-gear 16, splined upon a shaft 17, having bearing in the movable frame 9.

Upon each end of shaft 17 is loosely sleeved a gear-wheel 18 19, the gear 18 arranged to engage a gear 20 on a shaft 21, mounted in the movable frame, while gear 19 is arranged to engage another gear 22 on the opposite end of said shaft 21 through an intermediate idler-gear 23. By this arrangement it will be seen that shaft 21 will be rotated in opposite directions by the electric motor, according as gear 18 or 19 is clutched to rotate with shaft 17.

Mounted upon and forming part of the stationary frame are rack-bars 24 25, one on each side of the machine, arranged to be engaged by gears 26 27, mounted upon shaft 21 at the respective ends thereof.

By this construction and arrangement it will be seen that when shaft 21 is rotated in one direction or the other the frame 9, carrying the motor and the gearing above described, will be caused to travel along the stationary frame 8.

The relative sizes of the gears intermeshing with driving-gears 18 19 are so proportioned that when shaft 21 is rotated in one direction a slow movement of the traveling frame is imparted; but when said shaft 21 is rotated in the opposite direction a rapid movement or feed of the traveling frame is effected. The purpose of this construction and arrangement will more fully appear hereinafter.

I will now describe the construction of the clutch for throwing into and out of operation the gearing described above.

On the hub of each gear 18 19 is formed one jaw of a clutch 28 29 of suitable construction. Sleeved upon and splined to rotate with shaft 17 are the co-operating jaws 30 31, arranged to correspond with the respective jaws 28 29. A yoke 32, provided with bifurcated ends, is arranged to straddle and to be received in grooves in collars or sleeves 30 31. Projecting from a fixed part of the movable frame and through a perforation in a bracket 33, attached to yoke 32, is a rod 34. Mounted upon rod 34 are springs 35 36, arranged on opposite sides of bracket 33. The tendency of these springs is to maintain the yoke 32 in a normally central position and hence in a position to hold both clutch-jaws 30 31 out of engagement, respectively, with their co-operating jaws 28 29, and when yoke 32 is moved in one direction or the other from its normal position to throw into action either the one or the other of said clutch-jaws 30 31 it is against the action of a spring. A hand-lever 37 is pivoted, as at 38, to a fixed part of the movable frame, and to said lever is pivoted, as at 39, a link 40, pivoted at its opposite end to yoke 32, as at 41. It will be seen by reference to Fig. 2 that when yoke 32 is moved from its normal or central position—as, for instance, when lever 37 is moved to throw into engagement clutch-jaws 28 30—the pivot 39 travels around pivot 38, and after said pivot passes beyond a line drawn through pivots 38 and 41 it will have passed a dead-center, so to speak, and hence will be locked in that position, and any tendency of the meeting faces of clutch-jaws 28 30 to force said jaws out of engagement with each other will serve only to maintain said jaws more firmly in engagement with each other. This construction is particularly advantageous in machines of this class where the work required is heavy and the parts are subjected to severe strains. An action similar to that above described takes place when the lever is moved in the opposite direction to effect a clutching of jaws 29 31.

Moving with and forming a part of the movable framework at the front end of the machine is a grooved guideway formed of suitably-disposed guide-plates 42 43. Suitably mounted at each end of the guide-plates 42 43 are idler-sprockets 44 45. A drive-sprocket 46 is mounted upon to rotate with shaft 14 and upon sprockets 44 45 46, and arranged to travel in the guideway formed by plates 42 43 is a sprocket-chain 47, comprising links 48, provided with flanges 49, adapted to be received in the grooved guideway formed by plates 42 43 and cutter-blocks 50, pivoted to said links. The cutter-blocks are provided with sockets 51, adapted to receive the shanks of suitable cutters 52. As shown in Fig. 6, the cutter-blocks are arranged to project alternately in opposite directions. The cutters are also arranged to project in opposite directions as more clearly shown in Fig. 1. The object of this construction and arrangement is to effect a cut sufficiently broad in the coal vein to receive the cutter-chain and its supporting-plate as the cut progresses and as the cutter-chain is fed to its work. Suitably-arranged guideways 53 are provided to support the cutter-chain.

In order to take up slack and to accommodate for wear of parts, I mount the motor and gear-supporting frame adjustably in the movable frame 9 and provide a screw 54, whereby said motor and gear-supporting frame may be adjusted thereon. Guide-flanges 55 56, suitably secured to the motor-frame, are provided and are arranged to rest upon rackbars 24 25, thereby supporting the motor-frame and guiding it in its travel.

In practice I prefer to slightly bevel the meeting faces of the clutch-jaws, thereby assisting in releasing the clutch-jaws from their locked position when the yoke 32 is moved in opposite direction by lever 37.

I have not deemed it necessary to set forth in detail any specific form of electric motor, as the present invention does not reside in the particular construction of the motor, and many different forms of motors may be used in carrying out my invention.

In the specific arrangement of the links of the cutter-chain shown two contiguous cutter-links in one direction alternate with two contiguous cutter-links turned in the opposite direction, (see Fig. 6,) and each cutter 52 is preferably turned in an opposite direction with respect to the cutters adjacent thereto; but it will be evident that any other suitable or desirable arrangement may be employed.

It will be understood from the foregoing description that in operation the frame carrying the cutter-chain, the motor, and the operating-gearing is slowly advanced along the stationary frame when the lever 37 is operated to throw into operation the clutch-jaws 28 30. At the same time the cutter-chain 47 is caused to travel and the cutters carried thereby cut a pathway into the bed of coal. When the cut has been completed, a reverse movement of the lever 37 effects a disengagement of jaws 29 31, whereby a rapid withdrawal of the cutter-chain carrier-frame is effected.

I will now describe the construction and arrangement whereby the frame carrying the cutter-chain is guided and supported against lateral movement during the cutting operation, particular reference being had to Figs. 2 and 8.

Cast with or otherwise suitably formed on or secured to plate 42 is a pocket in the form of a dovetail formed by side flanges 57. In this pocket is adapted to be received the T-shaped shank of a cutting and supporting bar 58. I prefer to incline the upper portion of this bar from a vertical line, as shown more clearly in Fig. 8, and to bevel the front edge thereof to a knife-edge, as indicated at 59, Fig. 2. A bolt 60 may be provided to assist in retaining said cutter and supporting said bar rigidly in place. The cutting parts of the cutter and guide-bar 58 are arranged to project above the path of cut of the chain-cutters. From this construction it will be seen that as the frame carrying the chain cutters advances into the groove 61 in the bed of coal made by the chain cutters the cutting-edge of cutter and guide-bar 58 will be forced into the coal and will cut a straight groove therein in the upper wall of said cut 61. By inclining the bar from a vertical position this groove will be formed with a smooth wall, inclined with reference to a vertical plane and the direction of travel of the bar, and against which the body of the guide-bar 58 will bear, and hence guide and hold the frame carrying the chain cutter solidly while the chain cutter is performing its work. The feature of inclining the cutter 58 is important, as it enables me to cut a groove in the bed of coal having a smooth inclined wall. This is not possible where the cutter is a straight vertical cutter, as the tendency of the coal, as is well known, is to chip off and break when a cutter is forced or driven into it. Even in the present case the coal chips off on one side of the cutter, as indicated at 62; but I have found in practice that a cutter arranged as above decribed forms a smooth wall, against which the body of the cutter may bear.

It will be evident that a similar or any other suitably-arranged guide device and support may be applied to supporting-plate 43 to operate upon the other wall of cut 61, as indicated at 63, Figs. 1 and 8.

I do not herein claim the combination in an undercutting mining-machine having laterally-operating endless-chain cutters, with the cutter-carriage adapted to advance into the kerf or cut of a non-driven or relatively-stationary holding-cutter projecting directly upward from the carriage and having one or more points adapted to be pressed and held continuously against the coal forming the roof of the main kerf under the constant pressure of the carrier; but I confine my claim in this case covering this feature of my invention to a guide-bar inclined relative to its path of movement and arranged to cut an inclined groove in the wall of the cut made by the chain cutter.

It will be obvious that many alterations and changes in the details of construction and arrangement would readily suggest themselves to persons skilled in the art and still fall within the spirit or scope of my invention. I do not desire, therefore, to be limited to the exact details shown and described; but, Having now fully explained the principles of my invention and a form of apparatus embodying the same, what I claim as new, and desire to secure by Letters Patent of the United States, is—

1. In an electric mining machine, a stationary frame, racks carried thereby, a movable frame, an electric motor mounted on said movable frame, a main shaft arranged adjacent to and parallel with the armature shaft of said motor and adapted to be driven therefrom, a drive shaft mounted in said movable frame having gears thereon adapted to engage said racks, an intermediate shaft, gearing for driving said intermediate shaft from said main shaft, gear wheels loosely sleeved on said intermediate shaft, reversely arranged clutch jaws mounted to slide upon said intermediate shaft and splined to rotate therewith, and arranged to engage said sleeved gears respectively when shifted, gearing actuated by said sleeved gears for actuating said drive shaft, means for normally maintaining said clutch jaws out of engagement with said sleeved gears, a chain cutter mounted on said movable frame, and a gear mounted on said main shaft adapted to engage and drive said chain cutter; as and for the purpose set forth.

2. In an electric mining machine, a stationary frame, racks carried thereby, a movable frame, an electric motor mounted thereon, a main shaft, gearing for driving the same from the armature shaft of said motor, a drive shaft mounted in said movable frame, and having gears adapted to engage said racks, an intermediate shaft, gearing for driving the same from said main shaft, gear wheels loosely sleeved on said intermediate shaft, gearing actuated thereby for driving said drive shaft in reversed directions, reversely arranged clutch jaws splined upon said intermediate shaft and adapted when moved to engage said sleeved gears respectively, a yoke arranged to engage said clutch jaws, springs normally acting upon said yoke to maintain said clutch jaws out of engagement with said sleeved gears and a lever for moving said yoke against the action of said springs, a chain cutter mounted on said movable frame, a gear wheel mounted on said main shaft adapted to engage and actuate said chain cutter; substantially as and for the purpose set forth.

3. In an electric mining machine, a stationary frame, racks carried thereby, a movable frame, an electric motor mounted thereon, a main shaft journaled in said movable frame, gearing for driving said shaft from the motor armature shaft, a drive shaft mounted in said movable frame, gears mounted thereon adapted to engage said racks, an intermediate shaft, gearing for driving the same from said intermediate shaft, gear wheels loosely sleeved on said intermediate shaft, gearing actuated thereby for driving said drive shaft in reverse directions, reversely arranged clutch jaws splined to slide upon and to rotate with said intermediate shaft, and adapted when moved to engage said sleeved gears respectively, a yoke connected to said clutch jaws, a perforated bracket carried thereby, a rod adapted to be received through the perforation in said bracket, springs mounted on said rod and arranged to bear against said bracket on opposite sides thereof to normally maintain said clutch jaws out of engagement with said sleeved gears, a lever arranged to move said yoke against the action of one or the other of said springs to effect a clutching of said jaws with one or the other of said sleeved gears, a chain cutter, and a gear wheel mounted on said main shaft adapted to engage and actuate said cutter; all combined and arranged as and for the purpose set forth.

4. In an electric mining machine, a stationary frame, racks carried thereby, a movable frame, an electric motor, a main shaft, a drive shaft and an intermediate shaft mounted on said movable frame, gears mounted on said drive shaft adapted to mesh with said racks, gearing for driving said main shaft from the motor armature shaft, gearing for driving said intermediate shaft from said main shaft, gear wheels loosely sleeved upon said intermediate shaft, adapted to actuate said drive shaft, clutch jaws splined to slide upon and to rotate with said intermediate shaft, and adapted when moved to engage one or the other of said sleeved gear wheels, a yoke connecting said clutch jaws, a bracket carried by said yoke, springs arranged to bear on said bracket on opposite sides thereof, a lever pivoted at one end to said movable frame, a link pivotally connected at one end to said bracket and at the other end to said lever, intermediate the ends of said lever, whereby when said lever is operated to move said yoke and clutch jaws against the action of said springs, the pivoted point of said link with said lever passes a dead center, thereby locking a clutch jaw in operative position with respect to a sleeved gear, a chain cutter and a drive gear therefor mounted on said movable frame; as and for the purpose set forth.

5. In a machine of the class described, a cutter chain having cutter carrying links arranged alternately in right and left position with respect to each other, cutters adapted to be received in said links, the cutters in the right turned links arranged alternately in right and left position with respect to each other, and the cutters in the left-turned links arranged alternately in right and left position with respect to each other, the relative positions of the cutters in the left-turned links alternating with the relative position of the cutters in the right turned links; substantially as and for the purpose set forth.

6. In a machine of the class described and in combination with a frame carrying a chain cutter and means for actuating said cutter and for advancing said frame to its work, a stationary guiding bar provided with a cutting edge, said guiding bar being inclined relative to its path of movement, and arranged to cut a groove having an inclined wall in the wall of the cut made by said chain cutter; as and for the purpose set forth.

In witness whereof I have hereunto set my hand this 28th day of September, 1894.

EDMUND C. MORGAN.

In presence of—
 M. I. CAVANAGH,
 S. E. DARBY.